US007122773B2

(12) United States Patent
Yang

(10) Patent No.: US 7,122,773 B2
(45) Date of Patent: Oct. 17, 2006

(54) MAGNETRON FOR MICROWAVE OVENS AND METHOD OF FORMING SAME

(75) Inventor: Sung Chol Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 83 days.

(21) Appl. No.: 10/791,872

(22) Filed: Mar. 4, 2004

(65) Prior Publication Data

US 2005/0061805 A1 Mar. 24, 2005

(30) Foreign Application Priority Data

Sep. 9, 2003 (KR) ..................... 10-2003-0063002

(51) Int. Cl.
*H05B 6/64* (2006.01)
*H01J 23/22* (2006.01)
*B23K 1/00* (2006.01)

(52) U.S. Cl. .................................... 219/761; 315/39.51

(58) Field of Classification Search ................ 219/761; 315/39.51–39.77; 228/254; 445/23, 58
See application file for complete search history.

(56) References Cited

U.S. PATENT DOCUMENTS 5,090,613 A * 2/1992 Lee ............................ 228/254

OTHER PUBLICATIONS

Patent Abstracts of Japan for Publication No. 60-017836, dated Jan. 29, 1985.
Patent Abstracts of Japan for Publication No. 63-066825, dated Mar. 25, 1988.
Patent Abstracts of Japan for Publication No. 63-271845, dated Nov. 9, 1988.
Patent Abstracts of Japan for Publication No. 02-056823, dated Feb. 26, 1990.
Korean Patent Abstracts for Publication No. 1019920003337, dated Apr. 27, 1992.
Korean Patent Abstracts for Publication No. 1002081630000, dated Apr. 15, 1999.

* cited by examiner

*Primary Examiner*—Philip H. Leung
(74) *Attorney, Agent, or Firm*—Staas & Halsey LLP

(57) ABSTRACT

A magnetron for microwave ovens includes an anode cylinder, a plurality of plate-shaped vanes radially arranged along an inside surface of the anode cylinder, one or more strap rings to electrically connect the plurality of plate-shaped vanes to each other, an antenna connected to one of the plurality of vanes to radiate microwaves generated from the plurality of vanes. Each of the vanes is plated with a brazing material to be brazed to one or more of the anode cylinder, the one or more strap rings and the antenna, and the brazing material has a plating depth of about 2.25 to 8 μm. The magnetron having the anode allows a manufacturing process of the anode to be simplified to reduce manufacturing time and equipment costs. Furthermore, the anode prevents brazing defects, and allows the magnetron to have an optimal performance.

10 Claims, 3 Drawing Sheets

MAGNETRON FOR MICROWAVE OVENS AND METHOD OF FORMING SAME

CROSS-REFERENCE TO RELATED APPLICATION

This application claims the benefit of Korean Patent Application No. 2003-63002, filed Sep. 9, 2003 in the Korean Intellectual Property Office, the disclosure of which is incorporated herein by reference.

BACKGROUND OF THE INVENTION

1. Field of the Invention

The present invention relates, in general, to a magnetron for microwave ovens and, more particularly, to an anode of a magnetron for microwave ovens, which allows the magnetron to have an optimal performance while causing a manufacturing process of the anode to be simplified and assembly of the anode to be easily performed.

2. Description of the Related Art

Generally, a magnetron for microwave ovens is a high frequency oscillation tube having a fundamental frequency at 2450 MHz. The magnetron includes a cathode and an anode coaxially arranged to form an electric field, and a pair of pole pieces to form magnetic fields above and below the cathode and the anode.

A structure of an anode 100 is described in detail below. As shown in FIG. 1, the anode 100 includes an anode cylinder 110, a plurality of vanes 120 radially arranged in the anode cylinder 110 to form a resonant cavity, a plurality of strap rings 130 to electrically connect the plurality of vanes 120 to each other, and an antenna 140 connected to one of the plurality of vanes 120 to radiate microwaves. Assembly accuracy of the above-described component parts greatly influences performance of a magnetron. The anode 100 of the magnetron is manufactured by a conventional manufacturing method described below.

The anode cylinder 110, the plurality of vanes 120, the strap rings 130, and the antenna 140 are separately formed. The anode cylinder 110 is formed by cutting off and processing a pipe-shaped material, strap ring notches 121 are formed in each of the vanes 120 to fasten the strap rings 130, and an antenna notch 122 is formed in one of the plurality of vanes 120 to fasten the antenna 140.

Further, the strap rings 130 and the antenna 140 are brazed with a brazing material to be joined to the vanes 120.

The component parts are mounted on an assembly jig. The anode cylinder 110, the plurality of vanes 120, the strap rings 130, and the antenna 140 are fastened at predetermined locations using the assembly jig. A wire shaped brazing material is supplied from predetermined locations so that the wire shaped brazing material inserts between the plurality of vanes 120 and the anode cylinder 110.

The assembly jig on which the component parts are fastened is placed into a brazing furnace and is heated to more than 800° C. so that the brazing material melts and the component parts are joined to each other.

However, the conventional method of manufacturing the anode 100 of the magnetron is problematic in that complicated brazing processes, in which the wire shaped brazing material is used and the strap rings 130 and the antenna 140 must be separately plated with the brazing material, must be performed to braze the component parts. Furthermore, when the wire shaped brazing material is insufficiently inserted into joint portions, a brazing defect may be incurred.

SUMMARY OF THE INVENTION

Accordingly, it is an aspect of the present invention to provide a magnetron for microwave ovens, which has an anode to allow a manufacturing process thereof to be simplified, to allow the magnetron to have an optimal performance, and to prevent brazing defects attributable to insufficient blazing material from being inserted into the anode.

Additional aspects and/or advantages of the invention will be set forth in part in the description which follows and, in part, will be obvious from the description, of may be learned by practice of the invention.

The above and/or other aspects are achieved by providing a magnetron for microwave ovens, including an anode cylinder, a plurality of plate-shaped vanes radially arranged along an inside surface of the anode cylinder, one or more strap rings to electrically connect the plurality of the vanes to each other, an antenna connected to one of the plurality of vanes to radiate microwaves generated from the vanes, wherein each of the vanes is plated with a brazing material to be brazed to one or more of the anode cylinder, of the strap rings and of the antenna, and the brazing material has a plating depth in the range of about 2.25 μm to 8 μm.

The brazing material may be plated on one of entire surfaces and joint portions of the plurality of vanes to which the anode cylinder, the strap rings and the antenna are brazed.

The brazing material may contain silver of 72±2% in a weight ratio and copper of a remaining percentage.

Each of the vanes may be plated with a brazing material to be brazed to one or more of the anode cylinder, of the strap rings and of the antenna, and the brazing material may have a predetermined plating depth to prevent insufficiency and excess thereof after brazing.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
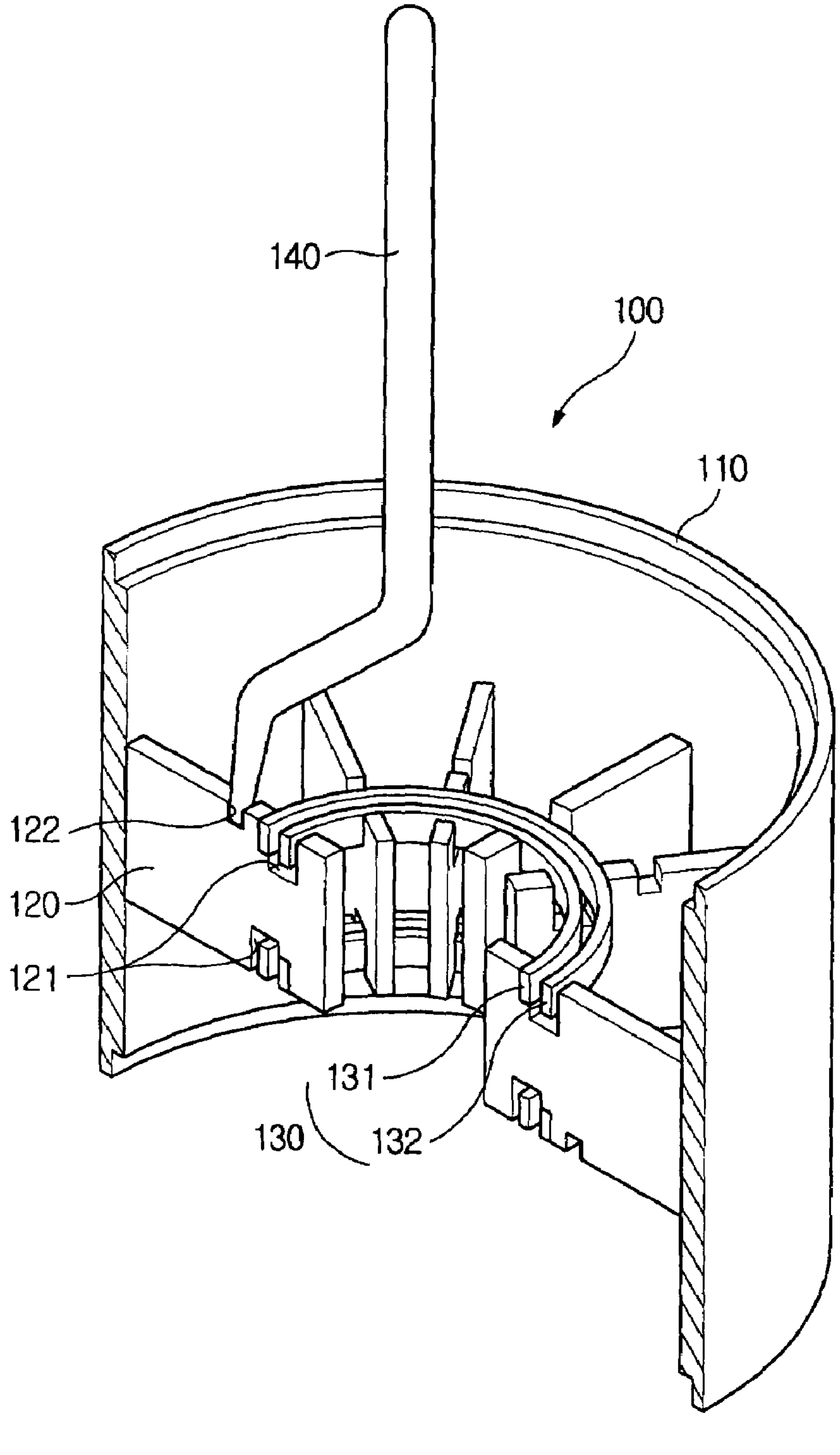
FIG. 1 is a perspective view showing a structure of a general anode of a magnetron for microwave ovens.

Reference will now be made in detail to the embodiment of the present invention, examples of which are illustrated in the accompanying drawings, wherein like reference numerals refer to like elements throughout.

Figure 2:
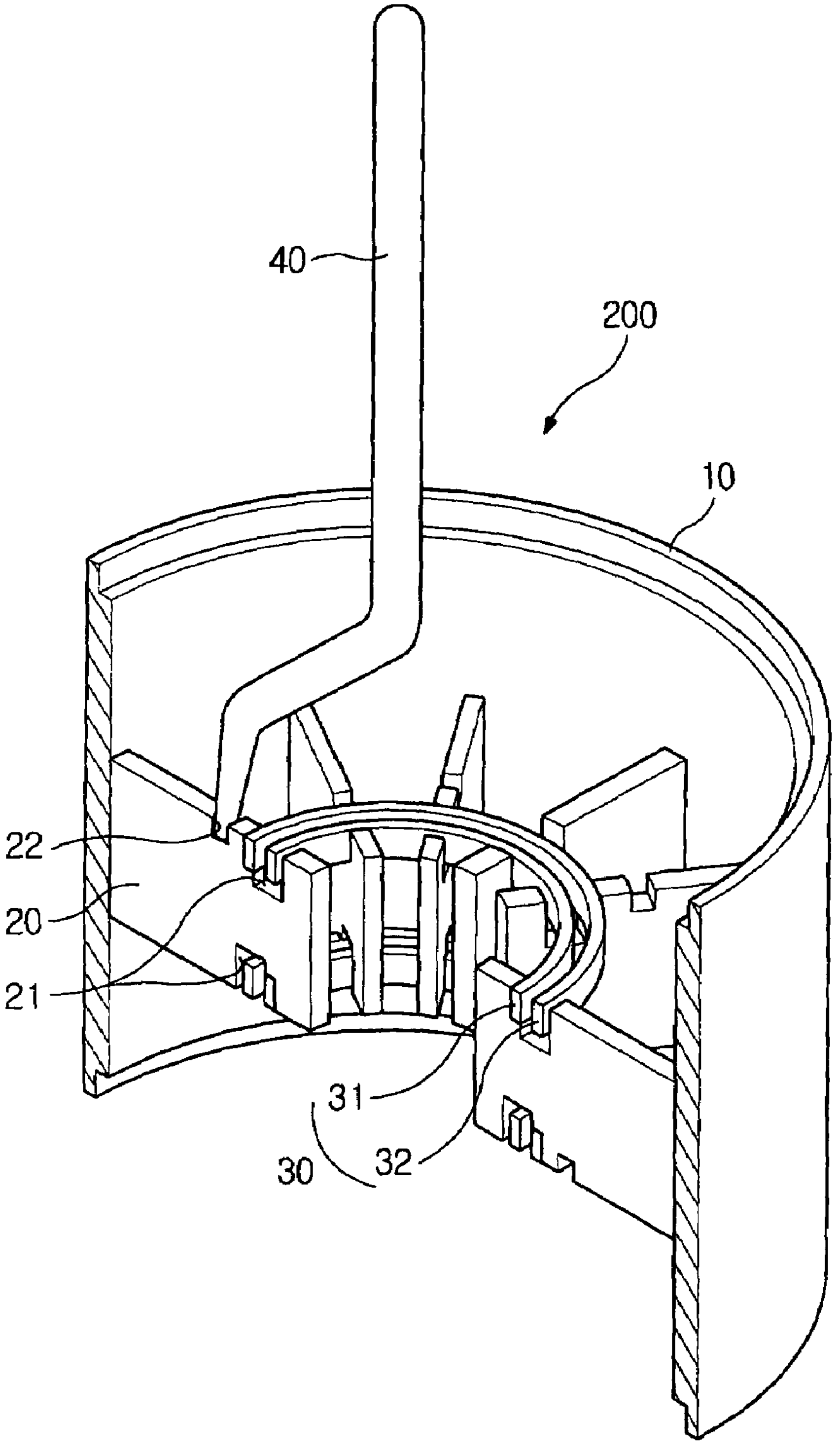
FIG. 2 is a perspective view showing a structure of an anode of a magnetron for microwave ovens, according to an embodiment of the present invention.

An anode 200 of a magnetron according to the present invention, as shown in FIG. 2, includes an anode cylinder 10, a plurality of plate-shaped vanes 20 radially arranged along an inside surface of the anode cylinder 10, one or more strap rings 30 to electrically connect the plurality of plate-shaped vanes 20 to each other, and an antenna 140 connected to one of the plurality of plate-shaped vanes 20 to radiate microwaves.

The anode cylinder 10, the plurality of plate-shaped vanes 20, the strap rings 30, and the antenna 40 are generally made of oxygen-free copper materials. The plurality of plate-shaped vanes 20 are formed in rectangular plate shapes, strap ring notches 21 are formed on a top and bottom of each of the vanes 20 to fasten the strap rings 30, and an antenna notch 22 is formed in one of the vanes 20 to fasten the antenna 40. A total of four strap rings 30 with a first pair of strap rings 30 placed in the tops of each of the vanes 20 and a second pair of strap rings 30 placed in the bottoms of each of the vanes 20 are provided. Each of the pairs of strap rings 30 has an inner strap ring 31 having a smaller diameter and an outer strap ring 32 having a larger diameter. The inner strap ring 31 and outer strap ring 32 of each of the pairs of strap rings 30 are alternately joined to the plurality of plate-shaped vanes 20 through the strap ring notches 21.

Furthermore, each of the plate-shaped vanes 20 is plated with a brazing material to be joined to the anode cylinder 10, the strap rings 30 and the antenna 40 by brazing. The brazing material is an alloy, which contains silver of about 72% in a weight ratio and copper of a remaining percentage. The brazing material may be plated on entire surfaces of each of the vanes 20, or on joint portions of each of the vanes 20 to join with other component parts of the anode 200.

A method of manufacturing the anode 200 of the magnetron is described below.

The method has several operations, which include separately forming component parts, plating brazing material on each of the vanes 20, mounting the component parts on an assembly jig, putting the assembly jig, on which the component parts are mounted, into a brazing furnace, heating the assembly jig, and separating a finished product from the assembly jig.

The component parts are separately formed. A pipe shaped material is cut off and processed to form the anode cylinder 10. The plurality of vanes 20 are formed in rectangular plate shapes, the strap ring notches 21 are formed in a top and a bottom of each of the vanes 20 to fasten the strap rings 30, and the antenna notch 22 is formed in one of the vanes 20 to fasten the antenna 40. The strap rings 30 include the inner strap rings 31 each having the smaller diameter and the outer strap rings 32 each having the larger diameter. Further, the antenna 40 is formed to fasten to the one of the vanes 20.

Each of the vanes 20 is plated with brazing material. The brazing material is used to join each of the vanes 20 to the anode cylinder 10, the strap rings 30, and the antenna 40.

The component parts, which are the anode cylinder 10, the plurality of vanes 20, the strap rings 30 and the antenna 40, fasten at predetermined locations using the assembly jig.

The assembly jig on which the component parts are mounted is placed into the brazing furnace and heated to more than 800° C., so that the brazing material plated on each of the vanes 20 melts and, thus, each of the vanes 20 adheres to joint portions of the anode cylinder 10, the strap rings 30, and the antenna 40.

In the method of manufacturing the anode 200 of the magnetron, the brazing material is plated only on the vanes 20. Thus, the manufacturing process is simplified and equipment and time needed for assembly of the anode 200 are reduced because the brazing material does not have to be plated on the strap rings 30 and the antenna 40.

Furthermore, brazing defects incurred when using a conventional wire shaped brazing material which is insufficiently inserted into the joint portions are prevented.

Hereinafter, degrees of brazing so that the magnetron may operate at optimal performance according to plating depths of the brazing material plated on each of the vanes 20 are described in detail with reference to FIG. 3.

Figure 3:
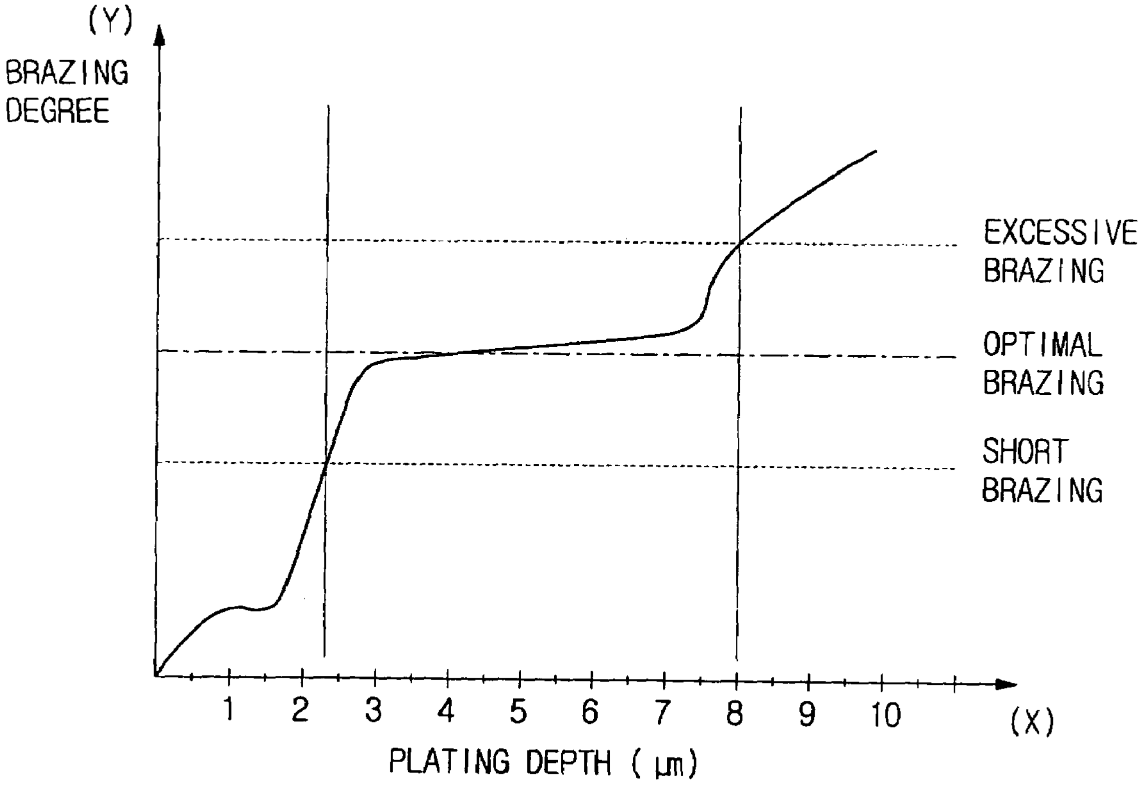
FIG. 3 is a graph showing degrees of brazing according to plating depths of a brazing material plated on the anode of the magnetron, according to the embodiment of the present invention.

FIG. 3 is a graph showing the degrees of brazing according to the plating depths of the brazing material. An X-axis represents the plating depth, while a Y-axis represents the degrees of brazing according to the plating depths. A one-dot chain line represents an optimal degree of brazing. Two dotted lines, which are shown above and below the one-dot chain line, respectively, represent tolerance limits of the degrees of brazing.

As shown in FIG. 3, the brazing depth with which the optimal degree of brazing is obtained is about 4 to 6 μm, and the tolerance limits of the brazing depth are about 2.25 μm and 8 μm. If the plating depth is smaller than 2.25 μm, a phenomenon, in which component parts that must be brazed are not brazed, may occur due to a shortage of the brazing material. If the plating depth is larger than 8 μm, the brazing material is excessive, so that the brazing material left over after brazing remains on surfaces of the component parts and, thus, negatively affect surface accuracies thereof and a performance of the magnetron may suffer.

As is apparent from the above description, a magnetron is provided, in which brazing material is plated only on vanes rather than on all of component parts, to braze the component parts of an anode, thus simplifying a manufacturing process thereof. Further, a manufacturing time and a cost of equipment are reduced. Moreover, a brazing defect caused by insufficient brazing material inserted between the vanes and an anode cylinder is prevented.

Further, when the plating depth of the brazing material is maintained within a range of about 4 μm to 6 μm, an optimal degree of brazing is obtained and a performance reliability of the magnetron is improved.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A magnetron for microwave ovens, comprising:

an anode cylinder;

a plurality of plate-shaped vanes radially arranged along an inside surface of the anode cylinder;

one or more strap rings to electrically connect the plurality of the vanes to each other; and an antenna connected to one of the plurality of vanes to radiate microwaves generated from the vanes;

wherein each of the vanes is plated with a brazing material, having a plating depth of about 2.25 μm to 8 μm, to be brazed to one or more of the anode cylinder, of the one or more strap rings and of the antenna, and the brazing material is plated on only joint portions of each of the vanes to which the anode cylinder, the one or more strap rings and the antenna are brazed.

2. The magnetron as set forth in claim 1, wherein the brazing material contains silver of 72±2% in a weight ratio of the brazing material with copper providing a remaining percentage thereof.

3. The magnetron as set forth in claim 1, wherein the plating depth of the brazing material is about 4 μm to 6 ±m.

4. A magnetron for microwave ovens, comprising:

an anode cylinder;

a plurality of vanes arranged in a radial direction inside of the anode cylinder, each of the vanes being plated with a blazing material having a plating depth of about 2.25 μm to 8 μm;

one or more rings to connect with the plurality of the vanes and to electrically connect the plurality of vanes to each other; and an antenna connected to one of the plurality of vanes and radiating microwaves generated from the plurality of vanes, wherein each of the vanes is brazed to one or more of the anode cylinder, of the one or more rings and of the antenna, wherein the brazing material is plated on only joint portions of each of the vanes to which the anode cylinder, the one or more rings and the antenna are brazed.

5. The magnetron as set forth in claim 4, wherein the brazing material comprises a ratio of silver to copper of between about 2.3 to 2.9 by weight.

6. The magnetron as set forth in claim 4, wherein the brazing material comprises about 70% to 74% silver by weight.

7. The magnetron as set forth in claim 4, wherein the plating depth of the brazing material is about 4 μm to 6 μm.

8. The magnetron as set forth in claim 4, wherein each of the vanes is formed in rectangular plate shapes and comprises:

a first pair of ring notches formed in a top of each of the vanes to fasten a first pair of the rings to each of the vanes;

a second pair of ring notches formed in a bottom of each of the vanes to fasten a second pair of the rings to each of the vanes; and an antenna notch formed in one of the vanes to fasten the antenna to the one vane.

9. A method of forming a magnetron for microwave ovens including an anode cylinder, a plurality of plate-shaped vanes radially arranged along an inside surface of the anode cylinder, one or more rings to electrically connect the plurality of the vanes to each other, and an antenna mounted on one of the plurality of vanes to radiate microwaves generated from the vanes, comprising;

brazing one or more of the anode cylinder, of the one or more rings and of the antenna with a brazing material having a predetermined plating depth of about 2.25 μm to 8 μm, the brazing material being plated on only joint portions of each of the vanes to which the anode cylinder, the one or more rings and the antenna are brazed.

10. A method of forming a magnetron for microwave ovens, comprising:

forming a plurality of vanes along with brazing material having a plating depth of about 2.25 μm to 8 μm;

providing one or more rings, an anode cylinder and an antenna; and forming the magnetron by brazing the plurality of vanes inside of the anode cylinder to the one or more rings and one of the vanes to the antenna, wherein the forming of the plurality of vanes comprises plating only joint portions of each of the vanes to which the anode cylinder, the one or more rings and the antenna are brazed.

* * * * *

UNITED STATES PATENT AND TRADEMARK OFFICE

CERTIFICATE OF CORRECTION

PATENT NO. : 7,122,773 B2
APPLICATION NO. : 10/791872
DATED : October 17, 2006
INVENTOR(S) : Sung Chol Yang It is certified that error appears in the above-identified patent and that said Letters Patent is hereby corrected as shown below:

Column 4, Line 67, change “6 ±m.” to --6 $\mu$m.--

Signed and Sealed this

Sixth Day of March, 2007

JON W. DUDAS

*Director of the United States Patent and Trademark Office*